United States Patent
Lee

(10) Patent No.: US 7,155,217 B1
(45) Date of Patent: Dec. 26, 2006

(54) METHOD AND APPARATUS FOR MANAGING ADJUNCT ACCESS AND LEASED FACILITIES

(75) Inventor: Ted Chongpi Lee, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 417 days.

(21) Appl. No.: 09/625,889

(22) Filed: Jul. 26, 2000

(51) Int. Cl.
*H04Q 7/20* (2006.01)

(52) U.S. Cl. ............... 455/424; 455/445; 455/560

(58) Field of Classification Search ........... 455/445, 455/560, 423, 424; 370/398, 410, 252, 254, 370/244; 379/219, 1.01, 2, 14; 709/224
See application file for complete search history.

(56) References Cited

U.S. PATENT DOCUMENTS

| | | | | |
|---|---|---|---|---|
| 5,513,173 A | * | 4/1996 | Machemer et al. | 370/252 |
| 5,550,911 A | * | 8/1996 | Bhagat et al. | 379/221.11 |
| 5,550,912 A | * | 8/1996 | Akinpelu et al. | 379/221.02 |
| 5,574,723 A | * | 11/1996 | Killian et al. | 370/384 |
| 5,629,938 A | * | 5/1997 | Cerciello et al. | 370/384 |
| 5,896,440 A | * | 4/1999 | Reed et al. | 379/9.03 |
| 6,118,936 A | * | 9/2000 | Lauer et al. | 709/224 |
| 6,145,001 A | * | 11/2000 | Scholl et al. | 709/223 |
| 6,201,812 B1 | * | 3/2001 | Christie | 370/410 |
| 6,282,279 B1 | * | 8/2001 | Ricciardi | 379/219 |
| 6,415,150 B1 | * | 7/2002 | Owens et al. | 455/445 |

OTHER PUBLICATIONS

Annabel Z. Dodd, "The Essential Guide to Telecommunications," 1998, pp. 144-145.*

* cited by examiner

*Primary Examiner*—Matthew D. Anderson
*Assistant Examiner*—Philip J. Sobutka

(57) ABSTRACT

The invention comprises a method and apparatus for managing adjunct access and leased facilities in network management systems. The invention advantageously provides a continuous circuit by opportunistically using cross connect links to represent the connection of managed and non-managed portions of a circuit.

15 Claims, 4 Drawing Sheets

METHOD AND APPARATUS FOR MANAGING ADJUNCT ACCESS AND LEASED FACILITIES

TECHNICAL FIELD

The invention relates to the field of communication systems and, more particularly, the invention relates to a method and apparatus for managing a telecommunications carrier's network including Access Network and Leased Facilities in a network management system.

BACKGROUND OF THE INVENTION

In providing telecommunication services to customers via a circuit, interexchange carriers (IECs), such as long distance service providers must hand off the circuit to local exchange carriers (LECs) each time the circuit passes through an adjunct access area. Adjacent access areas are known as Local Access Transport Areas (LATAs) and are geographical areas under the exclusive control of LECs (i.e., Bell Atlantic, Bell South, etc). The IEC, however, is allowed control of the circuits between adjunct access areas.

Similarly, a first IEC may lease facilities from a second IEC in order to provide service where the first IEC has no facilities For example, rather than building facilities and missing a customer due date for a provisional circuit, it may be more economical for the first IEC to lease facilities from the second IEC. However, the portion of the circuit making up the leased portion is under the exclusive control of the second IEC.

Any portion of the circuit under the control of the IEC is considered to be managed, since the circuit is managed by the IEC's Network Management System (NMS). For instance, the layout of the circuit with various component network elements may be displayed by entering the respective circuit identifier into the NMS. The circuit can be provisioned and inventoried via the respective circuit identifier.

Those portions of the circuit under the control of the LEC are considered non-managed meaning that portion of the circuit is managed by the LEC's network management system.

Unfortunately, since the IECs do not have access to the LEC's network management system, "work arounds" have to be implemented in order to depict the non-managed portions of the circuit For example, each managed portion of a circuit having a non-managed portion may be given a separate circuit identifier. This requires that each managed portion of a circuit reference all managed portions sequentially resulting in wasted man-hours and customer dissatisfaction due to IEC employees having to spend time locating appropriate sections of the circuit for a customer.

In the case of circuits designed or provisioned automatically, when a managed portion of a circuit is detected during such design the circuit will "fall out" of the design process in order for a human to continue the design process. This also results in wasted man-hours.

In another case, a cloud or black box is used to represent the non-managed portion of the circuit. In this case, there is no distinction made between a digital or optical carrier system, and the network elements within the non-managed portion are not inventoried in the network management system.

In another case, the network management system has no fault management (FM) capabilities within the non-managed portions of the circuit. Alarm information concerning the status of a managed portion of the circuit can not be transmitted through the non-managed portion of the circuit. Thus, each managed portion of a circuit is monitored for alarms separately.

The previously mentioned "work arounds" do not adequately meet the needs of the communications community in resolving how to depict managed and non-managed portions together on a circuit.

SUMMARY OF THE INVENTION

The invention comprises a method and apparatus for managing adjunct access and leased facilities in network management systems. The invention advantageously provides a continuous circuit by opportunistically using cross connect links to represent the connection of managed and non-managed portions of a circuit.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of provisioning a circuit, such as an Asynchronous Transfer Mode (ATM), Synchronous Optical Network (SONET) or other circuit, within a communications system managed by a network management system. The network management system may comprise, illustratively, the OneVision™ Management System (OVMS) manufactured by Lucent Technologies of Murray Hill, N.J.

It should be noted that the present invention does not require a specific communication service type. Moreover, a specific type of service may not be requested by a customer, such as a customer merely seeking a circuit path from a point of origination to a point of destination. Therefore, those skilled in the art and informed by the teachings of the present invention will be readily able to adopt any appropriate service type for use with the present invention.

Figure 1:
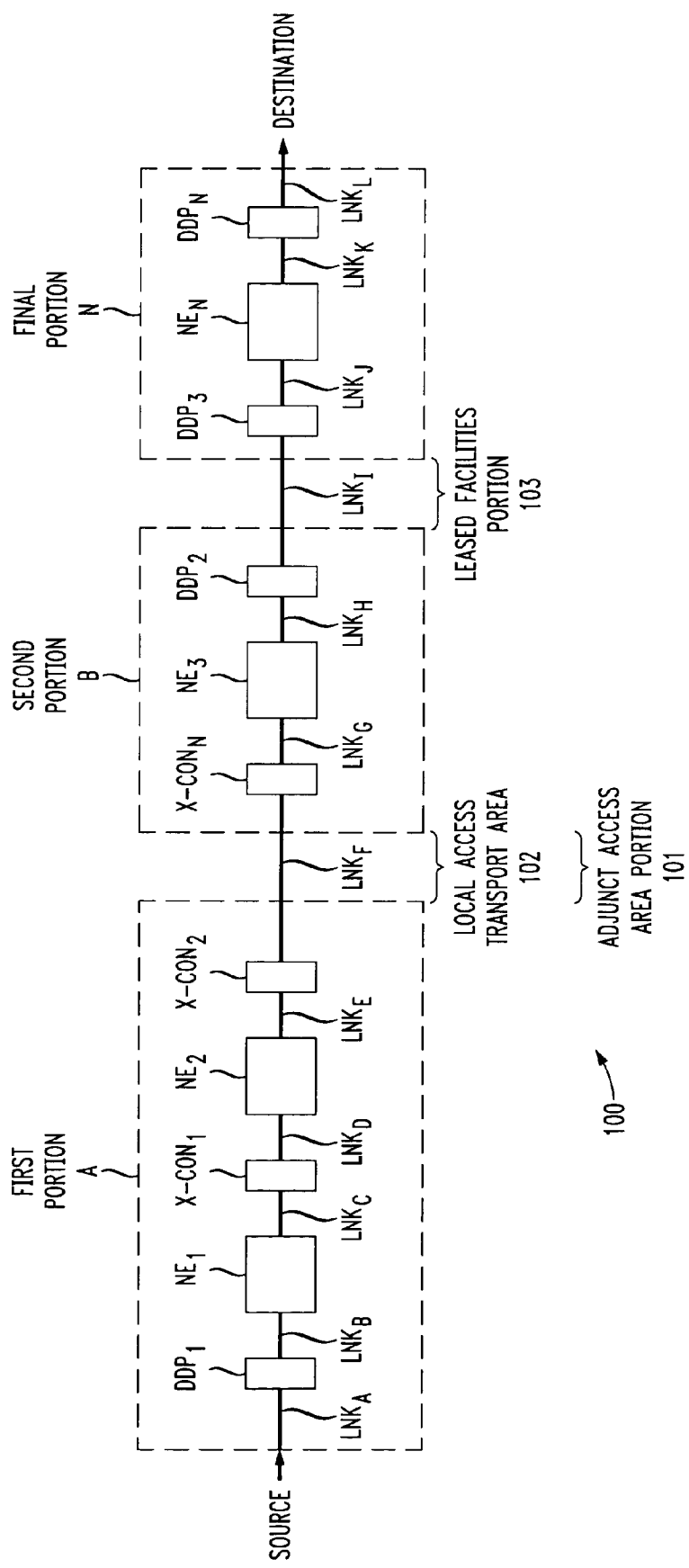
FIG. 1 depicts a high-level block diagram of a circuit traversing managed and non-managed portions of a network according to one embodiment of the invention.

FIG. 1 depicts a high-level block diagram of a circuit traversing managed and non-managed portions of a network according to one embodiment of the invention. Specifically, the circuit 100 of FIG. 1 comprises a plurality of managed portions denoted as Portion A, Portion B and so on up to Portion N which are linked together via non-managed portions.

First Portion A, which represents a geographic location or central office, receives a signal such as a Digital Signal Level 3 (DS3) or synchronous Electrical Carrier Level 1 (EC1) signal at a first distribution drop point $DDP_1$ via a first link $LNK_A$. The distribution drop point $DDP_1$ comprises a cross-connect that serves as an interface or hand off point where a customer is provided with a signal. The output of the $DDP_1$ is coupled to a second link $LNK_B$.

A first network element $NE_1$, illustratively a digital cross-connection system (DCS) or multiplexer, receives signal from the second link $LNK_B$. It will be appreciated by those skilled in the art that the first network element $NE_1$ and other network elements to be described below, may be implemented using any network element technology suitably for logically routing a signal.

The output of the first network element $NE_1$ is coupled to a first cross-connect $X-CON_1$ via a third link $LNK_C$. An output of the first cross-connect $X-CON_1$ is coupled to a second network element $NE_2$ via a fourth link $LNK_D$. The second network element $NE_2$ may also comprise a DCS. A signal may be routed to the second network element $NE_2$ for a variety of reasons. For example, the first network element $NE_1$ is unable to route the signal to an appropriate destination within the first Portion A. Therefore, the second network element $NE_2$ provides the appropriate routing.

The signal is passed from the second network element $NE_2$ to a second cross-connect $X-CON_2$ via a fifth link $LNK_E$. In the exemplary embodiment of FIG. 1, the second cross-connect $X-CON_2$ provides an output for the first Portion A of the circuit.

The signal is provided from the output of first Portion A (i.e., the output of second cross-connect $X-CON_2$) to an input of the second Portion B of the circuit via a sixth link $LNK_F$. Specifically, the output of the second cross-connect $X-CON_2$ is coupled to the input of a third cross-connect $X-CON_3$, which is within the second Portion B of the circuit. The output of the third cross-connect $X-CON_3$ is coupled to a third network element $NE_3$ via a $7^{th}$ link $LNK_G$, and to a second distribution drop point $DDP_2$ via an eighth link $LNK_H$.

It is noted that the sixth link $LNK_F$ spans an adjunct access area portion 101 between the first Portion A and second Portion B of the circuit. Since, in the embodiment of FIG. 1, the adjunct access area portion 101 is under the control of a local exchange carrier (LEC), the LEC provides its own equipment to bridge between the first Portion A and second Portion B of the circuit. However, the adjunct access area portion 101 is considered non-managed by the inter-exchange carriers (IEC) network management system since the IEC network management system has no knowledge of the equipment used by the LEC to connect the first Portion A to the second Portion B of the circuit. Thus, by using a sixth link $LNK_E$ to connect the first Portion A to the second Portion B of the circuit, the IEC has made a non-managed portion of the circuit become a managed entity within the IECs Network Management System.

The signal is provided from output of the second Portion B (i.e., the output of the second distribution drop point $DDP_2$) to an input of the final Portion N. Specifically, the output of the second drop point $DDP_2$ is coupled to the input of a third drop point $DDP_3$. The output of the third distribution drop point $DDP_3$ is coupled to the input of an $n^{th}$ network element $NE_N$ via tenth link $LNK_J$. The output of the $n^{th}$ network element $NE_N$ is coupled to an input of an $n^{th}$ distribution drop point $DDP_N$ via an eleventh link $LNK_K$. The output of the $n^{th}$ distribution drop point $DDP_N$ is coupled to a twelfth link $LNL_L$, which connects the circuit to its destination.

It is noted that the ninth link $LNK_I$ represents a link between the second partition B and final partition N passing through leased facilities from another IEC. For example, in order to provide service to a customer, a first IEC may have leased facilities from a second IEC in areas where the first IEC lacks facilities. Since the first IEC does not know the type of equipment used, or at least does not have management information regarding the equipment used, the leased facility portion is considered non-managed by the IECs network management system. However, by constructing the link spanning the leased facilities portion 103 between the second partition B and final partition N of the circuit, the ninth link $LNK_1$ may be considered as a managed portion of the circuit.

By connecting a first Portion A, a second Portion B and a final Portion N via links, a continuous managed circuit is provided allowing the circuit 100 to be identified in the IEC's network management system with one circuit identifier as opposed to a circuit identifier for each portion of the circuit. In addition, the automated design process works efficiently because circuit 100 is managed from first Portion A to final Portion N. Also, alarm monitoring for circuit 100 is complete because each portion of circuit 100 is managed because the links provide a continuous circuit.

In another embodiment of the invention, the cross connects (X-CON) are Digital Signal Cross Connects (DSX). In this embodiment of the invention, the links used to connect portions of a circuit are twisted pair and/or coaxial cable for transmitting a signal between network elements having a digital interface.

In another embodiment of the invention, the cross connects (X-CON) are Light-wave Guided Cross Connects (LGX). Therefore, the links used to connect portions of a circuit are fiber optic cables for transmitting an optical signal between network elements NE having an optical interface.

Figure 2:
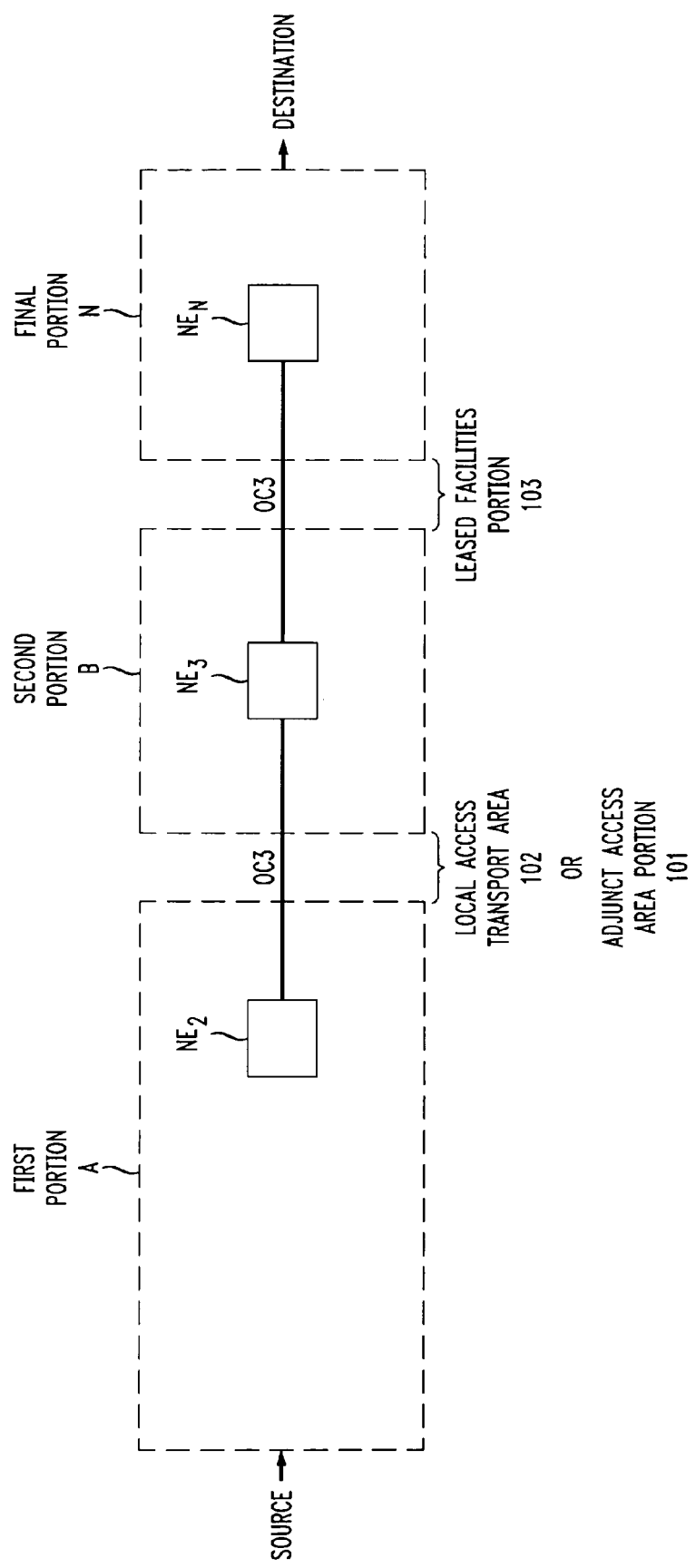
FIG. 2 depicts a high level block diagram of a circuit provisioned according to an embodiment of the present invention.

FIG. 2 depicts a high level block diagram of a circuit provisioned according to an embodiment of the present invention. Specifically, in the embodiment of the invention depicted in FIG. 2, links used to connect portions of a circuit that are categorized as carrier systems and cross-connects (such as depicted above in FIG. 1) are not shown.

Referring now to FIG. 2, a circuit between a source and destination has been provisioned via a first portion A, a second Portion B and a final Portion N. A bridge between the first Portion A and second Portion B is formed using an adjunct access portion 101, illustratively a Local Access Transport Area 102. That is, the managed portions (first portion A and second portion B) proximate the non-managed portion 101/102 are used to bridge the non-managed portion. It is noted that the non-managed portion may comprise an adjunct access area 101, a leased facilities portion 103, or other non-managed portion of a circuit. The invention operates to characterize the non-managed portion as a manageable network element such as a link, thereby enabling network management system control of all portions of the provisioned circuit.

In another embodiment of the invention, the links used to bridge non-managed portions of a circuit are categorized as carrier systems. In this embodiment, cross connects are not used, as depicted in FIG. 2. Rather, the links bridging a first Portion A, second Portion B and a final Portion N comprise, illustratively, an Optical Carrier Level 3 (OC-3) system. Specifically, Network element $NE_2$ of first Portion A is coupled to network element $NE_3$ of second Portion B via an OC-3 link. Network element $NE_3$ is also coupled to final network element $NE_N$ of final Portion N via an OC-3 link. This allows the carrier to be channelized according to the termination of the leased network or adjunct access network. For instance, an OC-3 link may be terminated as 84 Digital Signal level one (DS-1) or three DS-3s or a suitable combination such as 28 DS-1s and one DS-3. A channel of the OC-3 link will be assigned for the path between network elements.

Figure 3:
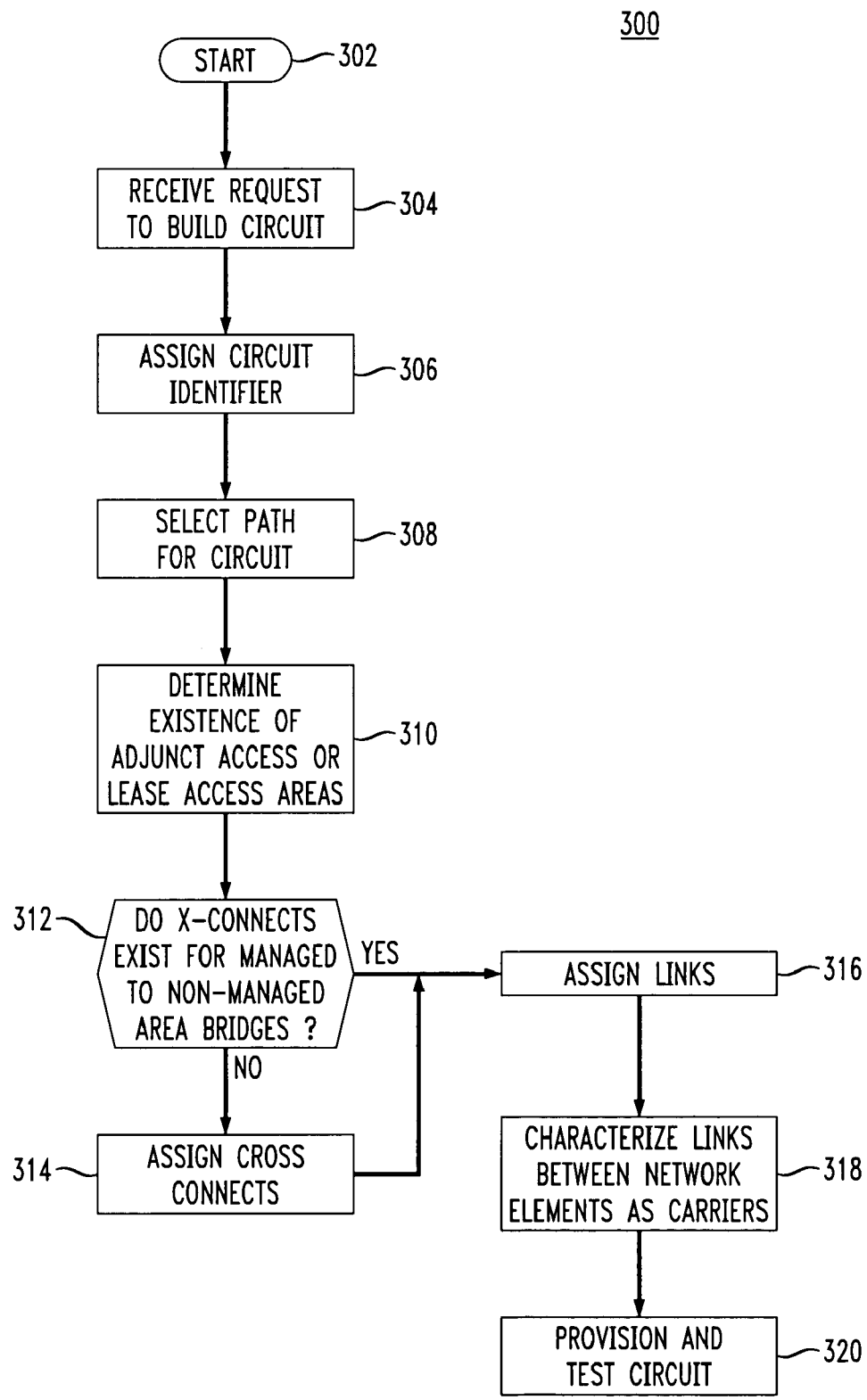
FIG. 3 depicts a flow diagram suitable for use in provisioning the circuit of FIG. 3.

FIG. 3 depicts a flow diagram suitable for use in provisioning the circuit of FIG. 1. Specifically, FIG. 3 depicts a flow diagram of a method 300 for provisioning a circuit 100 having adjunct access and/or leased access portions.

The method is entered at step 302 and proceeds to step 304, where a request to build a circuit is received. As previously mentioned with respect to FIG. 1, the request for a circuit can be for a particular technology type (e.g., SONET) for any type suitable for transporting a customer's data, wherein different technology types may be used. The method 300 then proceeds to step 306.

At step 306 a circuit identifier is selected to identify the circuit. This is the main circuit identifier or parent circuit identifier. If the circuit is required to be broken into portions, each portion of the circuit will refer to the parent circuit identifier. This allows personnel retrieving a portion of a circuit to relate that portion of the circuit to the whole circuit. The method 300 then proceeds to step 308.

At step 308 a path for circuit 100 is selected. In selecting a path for circuit 100 an originating central office and a destination central office are selected which are as close to the customer as possible, conditions permitting. The method 300 then proceeds to step 310.

At step 310 a determination is made as to the existence of adjunct access areas and/or a requirement for leased facilities for the circuit. Portions of the circuit that go through areas under the control of the LECs or require that facilities be leased from a different IEC (for example, in order to meet a customer's due date for completion of the circuit) are considered non-managed by the network management system. The method 300 then proceeds to step 312.

At step 312 a query is made as to whether the circuit contains cross connects for bridging the managed and non-managed portions of the circuit. If the query at step 312 is answered affirmatively, the method proceeds to step 316. If the query at step 312 is answered negatively, the method proceeds to step 314 where cross connects are assigned to the non-managed and managed portions of the circuit.

After finding that cross connects exist for the managed and non managed portions of the circuit (312) or assigning cross connects to the managed and non-managed portions of the circuit (314), the method 300 proceeds to step 316 where links are assigned to connect a cross connect in a managed portion of the circuit to a cross connect in a non-managed portion of the circuit.

The links may be stored as inventoried equipment in a database which maintains which link is associated with particular cross connects or ports in a cross connect. One such database can be Lucent Technologies' Physical Inventory Manager (PIM). Alternatively, the links can also be stored as noninventoried equipment. That is, links will not be inventoried as corresponding to particular cross connects or ports in a cross connect.

At optional step 318, the links connecting a managed portion of a circuit to a non-managed portion of a circuit may be categorized as a digital link (DL) carrier. The DL may be a digital carrier such as a DS-3 or an optical carrier (OC-3). The cross connects would not be depicted. All that would be shown is a carrier connecting a network element in a managed portion of the circuit to a network element in a non-managed portion of the circuit. A channel of the carrier would be assigned to designate the path between the network elements. The method 300 then proceeds to step 320, where the circuit is provisioned and tested prior to customer delivery.

Although the above-described invention is described primarily within the context of provisioning a new circuit, it will be appreciated by those skilled in the art that the teachings of the present invention may be advantageously employed on preexisting circuits. That is, in the case of a preexisting circuit including managed and non-managed portions, the teachings of the present invention may be used to adapt the non-managed portions as described above such that end-to-end circuit management may be achieved within the network management system.

Figure 4:
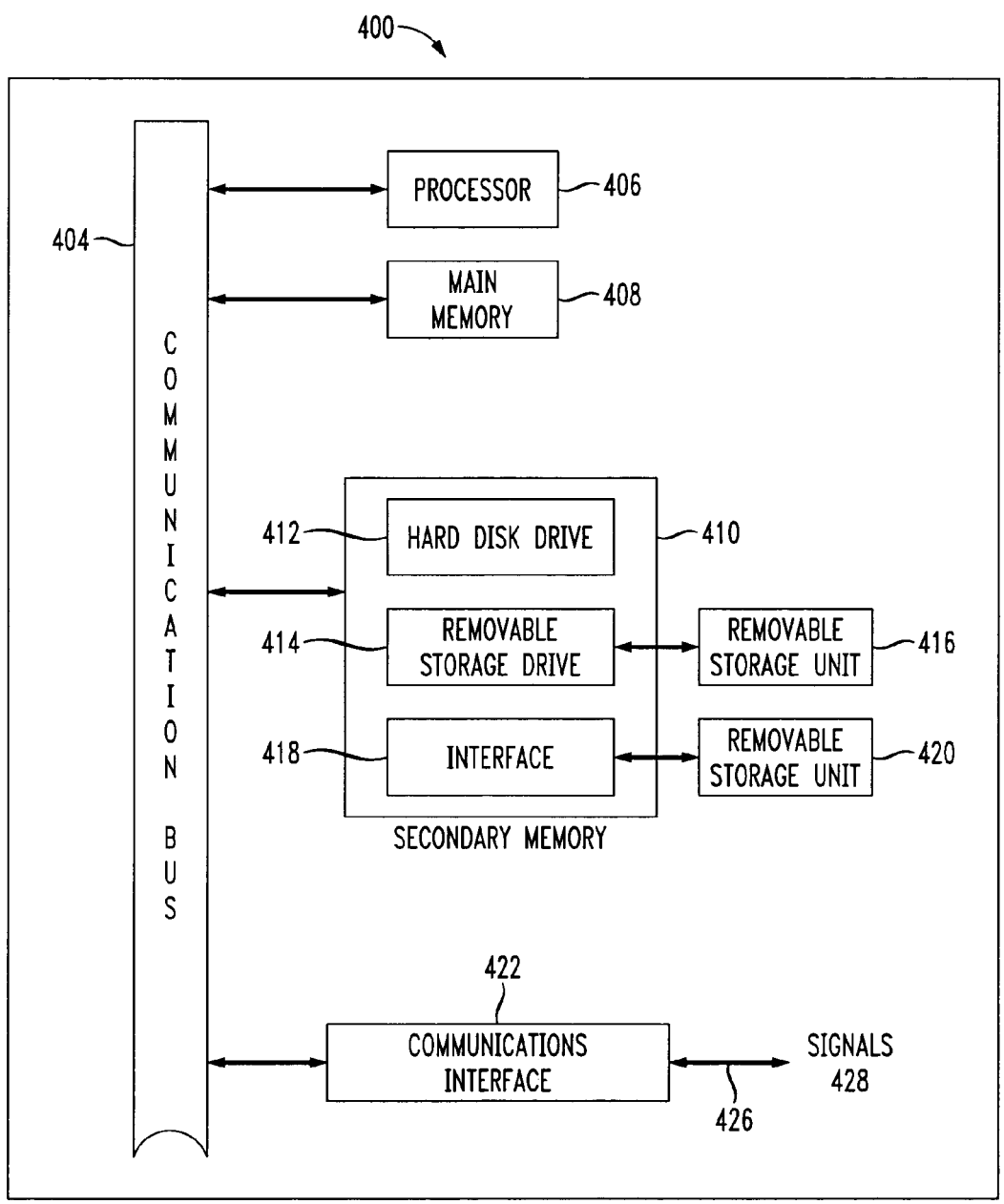
FIG. 4 depicts a high-level block diagram of a computer useful for implementing the provisioning process in FIG. 4.

FIG. 4 depicts a high level block diagram of a computer system useful for implementing the provisioning process of FIG. 3. Specifically, the computer system 400 comprises a communications port 404, a processor 406, a main memory 408, and may include a secondary memory 410. The secondary memory 410 may include a hard disk drive 412 and/or a removable storage drive 414 representing a floppy disk drive, a magnetic tape drive, an optical disk drive, etc. The removable storage unit 416, represents a floppy disk, magnetic tape, optical disk, etc. which is read by and written to by removable storage drive 414. As will be appreciated by those skilled in the art, the removable storage unit 416 includes a computer usable storage medium having stored therein the network management system.

In alternative embodiments, secondary memory 410 may include other similar means for allowing the network management system or other instructions to be loaded into computer system 400. Such means can include, for example, a removable storage unit 416 and an interface 418. Examples of such can include a program cartridge and cartridge interface (such as that found in video game devices), a removable memory chip (such as an EPROM, or PROM) and associated socket, other removable storage units 420 and interface 418 which allow software and data to be transferred from the removable storage unit 420 to computer system 400.

Computer system 400 can also include a communications interface 422. Communications interface 422 allows software and data to be transferred between computer system 400 and external devices. Examples of communications interface 422 can include a modem, a network interface (such as an Ethernet card), a communications port, a PCM-CIA slot and card, etc. Software and data transferred via communications interface 422 are in the form of signals which can be electronic, electromagnetic, optical or other signals capable of being received by communications interface 422. These signals 424 are provided to communications interface 422 via a medium 426. This medium 426 carries signals 428 and can be implemented using wire, cable, fiber optics, a phone line, a cellular phone link, a radio frequency (RF) link and other communication channels.

The network management system is stored in main memory 408 and/or secondary memory 410. The network management system can also be received via communications interface 422. The network management system, when executed, enable the computer system 400 to perform the features of the present invention as discussed herein. In particular, the network management system, when executed, enable the processor 406 to perform the features of the present invention.

In an embodiment where the invention is implemented using software, the network management system may be loaded into computer system 400 using removable storage drive 414, hard disk drive 412 or communications interface 422. When the network management system is executed by the processor 404, the processor 404 is able to perform the functions of the invention as described herein, In another embodiment of the invention where the invention is implemented primarily in hardware, using for example, hardware components such as Application Specific Integrated Circuits (ASICs). Implementation of the hardware functionality so as to perform the functions described herein will be apparent to persons skilled in the relevant art.

The above described invention advantageously provides a continuous circuit in a network management system. Moreover, the invention allows a circuit having adjunct access and leased facility portions to be on one circuit. In this manner, the invention provides a substantial improvement over prior art circuit design methods.

Although various embodiments which incorporate the teachings of the present invention have been shown and described in detail herein, those skilled in the art can readily devise many other varied embodiments that still incorporate these teachings.

What is claimed is:

1. A method for managing adjunct access for a circuit in a network management system, the method comprising the steps of:
    identifying a non-managed portion of a circuit, wherein the non-managed portion of the circuit comprises a network portion including equipment and links unknown to the network management system;
    identifying a first managed portion of the circuit proximate the non-managed portion of the circuit;
    identifying a second managed portion of the circuit proximate the non-managed portion of the circuit; and
    providing a manageable link between the first managed portion of the circuit and the second managed portion of the circuit, the manageable link adapted for being characterized as a managed entity by a management system.

2. The method of claim 1, wherein the manageable link is coupled to at least one of a Digital Cross Connect (DCS), a Light wave Guided Cross Connects (LGX), and a Distribution Drop Point (DDP).

3. The method of claim 2, wherein the manageable link comprises at least one of a fiber optic cable, a twisted copper pair, and a coaxial cable.

4. The method of claim 2, wherein the manageable link comprises at least one of a digital carrier and an optical carrier.

5. A method for designing a continuous circuit, comprising the steps of:
    determining whether a non-managed portion of a circuit exists;
    identifying the non-managed portion of the circuit, wherein the non-managed portion of the circuit comprises a network portion including equipment and links unknown to a network management system;
    representing the non-managed portion of the circuit as a first network element, the first network element adapted for being characterized as a managed entity by the network management system;
    identifying a second network element in a managed portion of the circuit proximate the non-managed portion of the circuit; and
    providing a manageable link between the first network element and the second network element, the manageable link adapted for being characterized as a managed carrier link by the network management system.

6. The method of claim 5, wherein the manageable link is coupled to at least one of:
    a Digital Cross Connect (DCS), a Light wave Guided Cross Connects (LGX), and a Distribution Drop Point (DDP).

7. The method of claim 6, wherein the manageable link comprises at least one of:
    a fiber optic cable, a twisted copper pair, and a coaxial cable.

8. The method of claim 6, wherein the manageable link comprises at least one of:
    a digital carrier and an optical carrier.

9. A method, comprising the steps of:
    receiving a request to provision a circuit;
    selecting a path for the circuit within a network comprising a plurality of network elements;
    assigning manageable links bridging non-managed portions of the circuit path by:
        identifying, for each of the non-managed portions of the circuit path, a first managed portion of the circuit path and a second managed portion of the circuit path; and
        providing, for each of the non-managed portions of the circuit path, a manageable link between the first managed portion of the circuit and the second managed portion of the circuit; and
    characterizing the manageable links as managed carrier links;
    wherein the non-managed portions of the circuit path comprise network portions including equipment and links unknown to a network management system.

10. The method of claim 9, further comprising the step of:
    determining if cross-connect network elements exist for bridging non-managed portions of said circuit path to managed portions of said circuit path; and
    assigning available cross-connect network elements to the manageable links bridging the non-managed portions of said circuit.

11. The method of claim 9, wherein said non-managed portions of said network comprise at least one of adjunct access facilities or leased facilities.

12. An apparatus for designing a continuous circuit, comprising:
    a processor and an associated storage device including instructions for controlling said processor, said instructions, when executed, causing said processor to perform the steps of:
    determining whether a non-managed portion of a circuit exists;
    identifying the non-managed portion of the circuit, wherein the non-managed portion of the circuit comprises a network portion including equipment and links unknown to a network management system;
    representing the non-managed portion of the circuit as a first network element, the first network element adapted for being characterized as a managed entity by the network management system;
    identifying a second network element in a managed portion of the circuit proximate the non-managed portion of the circuit; and
    providing a manageable link between the first network element and the second network element in the managed portion of the circuit, the manageable link adapted for being characterized as a managed carrier link by the network management system.

13. The apparatus of claim 12, wherein the manageable link is coupled to at least one of:
a Digital Cross Connect (DCS), a Light wave Guided Cross Connects (LGX), and a Distribution Drop Point (DDP).

14. The apparatus of claim 13, wherein the manageable link comprises at least one of:
a fiber optic cable, a twisted copper pair, and a coaxial cable.

15. The apparatus of claim 13, wherein the manageable link comprises at least one of:
a digital carrier, and an optical carrier.

* * * * *